United States Patent
Cabañero

(10) Patent No.: US 11,879,578 B2
(45) Date of Patent: Jan. 23, 2024

(54) ADJUSTABLE CABLE GUIDE FOR A FLAT CABLE

(71) Applicant: Lear Corporation, Southfield, MI (US)

(72) Inventor: Albert M. Cabañero, Cebu (PH)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 17/563,235

(22) Filed: Dec. 28, 2021

(65) Prior Publication Data

US 2023/0204133 A1 Jun. 29, 2023

(51) Int. Cl.
| | |
|---|---|
| *F16L 3/16* | (2006.01) |
| *F16L 3/08* | (2006.01) |
| *H02G 3/04* | (2006.01) |
| *F16L 3/13* | (2006.01) |
| *F16L 3/22* | (2006.01) |
| *H02G 3/06* | (2006.01) |

(52) U.S. Cl.
CPC .............. *F16L 3/16* (2013.01); *F16L 3/13* (2013.01); *H02G 3/0456* (2013.01); *F16L 3/08* (2013.01); *F16L 3/22* (2013.01); *H02G 3/06* (2013.01)

(58) Field of Classification Search
CPC ....... F16L 3/01; F16L 3/08; F16L 3/16; F16L 3/13; H02G 3/0456
See application file for complete search history.

(56) References Cited

U.S. PATENT DOCUMENTS

| | | | | |
|---|---|---|---|---|
| 4,614,452 | A | * | 9/1986 | Wang ............ F16C 11/10 403/97 |
| 6,409,411 | B1 | * | 6/2002 | Crorey ............. B25J 15/0052 403/54 |
| 7,317,623 | B2 | | 1/2008 | Nguyen et al. |
| 7,367,740 | B2 | * | 5/2008 | Lazic ............. F16M 11/12 403/103 |
| 2001/0010349 | A1 | * | 8/2001 | Sakakura ............. F16L 3/233 248/68.1 |
| 2006/0011380 | A1 | | 1/2006 | Pierce |
| 2006/0112519 | A1 | | 6/2006 | Harmon et al. |
| 2007/0087620 | A1 | * | 4/2007 | Yamamoto ............. H02G 11/00 439/422 |
| 2021/0045197 | A1 | | 2/2021 | Werner et al. |

FOREIGN PATENT DOCUMENTS

| | | | | |
|---|---|---|---|---|
| EP | 1729054 A2 | * | 12/2006 | ............. F16C 11/10 |
| JP | H0864322 A | * | 3/1996 | |
| JP | H08149662 A | * | 6/1996 | |

* cited by examiner

*Primary Examiner* — Tan Le
(74) *Attorney, Agent, or Firm* — MacMillan, Sobanski & Todd, LLC

(57) ABSTRACT

An angle clip assembly includes a first guide. The first guide has a first guide surface. A first retainer is adapted to retain a first part of a flat flexible cable on the first guide surface. The angle clip assembly also includes a second guide. The second guide has a second guide surface. A second retainer is adapted to retain a second part of the flat flexible cable on the second guide surface. The second guide is rotatable relative to the first guide about a lock axis to one of a plurality of assembly angles. The angle clip assembly includes a radial lock. The radial lock prevents rotation of the first guide relative to the second guide.

13 Claims, 7 Drawing Sheets

ADJUSTABLE CABLE GUIDE FOR A FLAT CABLE

BACKGROUND OF THE INVENTION

This invention relates to a support for an electrical cable. More specifically, this invention relates to a support for a flat flexible cable that may be adjusted to hold the flat flexible cable in a desired route.

A flat flexible cable is a type of electrical cable that includes a flat, flexible base that supports one or more flat electrical conductors thereon. Flat flexible cables are typically used in devices having a large amount of electronics in a relatively small space. In such devices, the flat flexible cable can provide for easier cable management than a conventional round electrical cable. It would be advantageous to have a support to retain the flat flexible cable in a desired position when it is routed through a space.

SUMMARY OF THE INVENTION

The invention relates to an angle clip assembly. The angle clip assembly includes a first guide. The first guide has a first guide surface. A first retainer is adapted to retain a first part of a flat flexible cable on the first guide surface. The angle clip assembly also includes a second guide. The second guide has a second guide surface. A second retainer is adapted to retain a second part of the flat flexible cable on the second guide surface. The second guide is rotatable relative to the first guide about a lock axis to one of a plurality of assembly angles. The angle clip assembly includes a radial lock. The radial lock prevents rotation of the first guide relative to the second guide.

In another embodiment, the radial lock includes a first plurality of teeth on the first guide and a second plurality of teeth on the second guide. The first plurality of teeth mesh with the second plurality of teeth to prevent rotation of the first guide relative to the second guide. And the angle clip assembly includes an axial lock. The axial lock includes a plurality of lock arms that extend from the second guide parallel to the lock axis. The lock arms engage the first guide to prevent movement of the first guide relative to the second guide in a direction parallel to the lock axis.

In another embodiment, the angle clip assembly engages a flat flexible cable to provide a supported cable assembly. The flat flexible cable has a first side and a opposed second side. A first part of first side of the flat flexible cable is retained on the first guide surface. A second part of the first side of the flat flexible cable is retained on the second guide surface. The second guide surface is on the opposite side of the angle clip assembly from the first guide surface.

Various aspects of this invention will become apparent to those skilled in the art from the following detailed description of the preferred embodiment, when read in light of the accompanying drawings.

DETAILED DESCRIPTION OF THE PREFERRED EMBODIMENT

Figure 1:
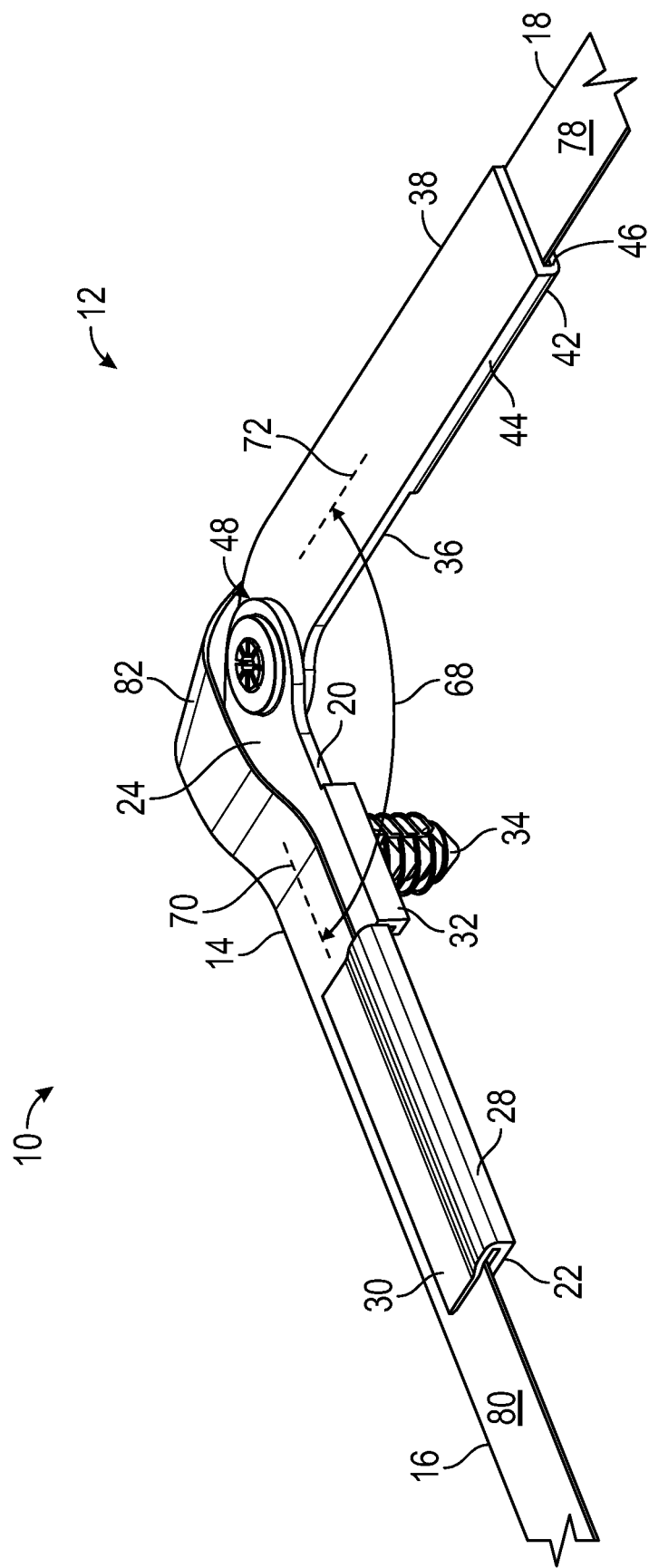
FIG. 1 is a perspective view of a supported cable assembly, including an angle clip assembly and a flat flexible cable.

Referring now to the drawings, there is illustrated in FIG. 1 a supported cable assembly, indicated generally at 10. The supported cable assembly 10 includes an angle clip assembly, indicated generally at 12, that engages a cable 14. The illustrated cable 14 is a flat flexible cable, but may be any desired type of cable. The angle clip assembly 12 engages the cable 14 and supports the cable 14 between a first cable run 16 and a second cable run 18. In the illustrated embodiment, the first cable run 16 is generally perpendicular to the second cable run 18, but the first cable run 16 and the second cable run 18 may be disposed at any desired relative angle.

Figure 2:
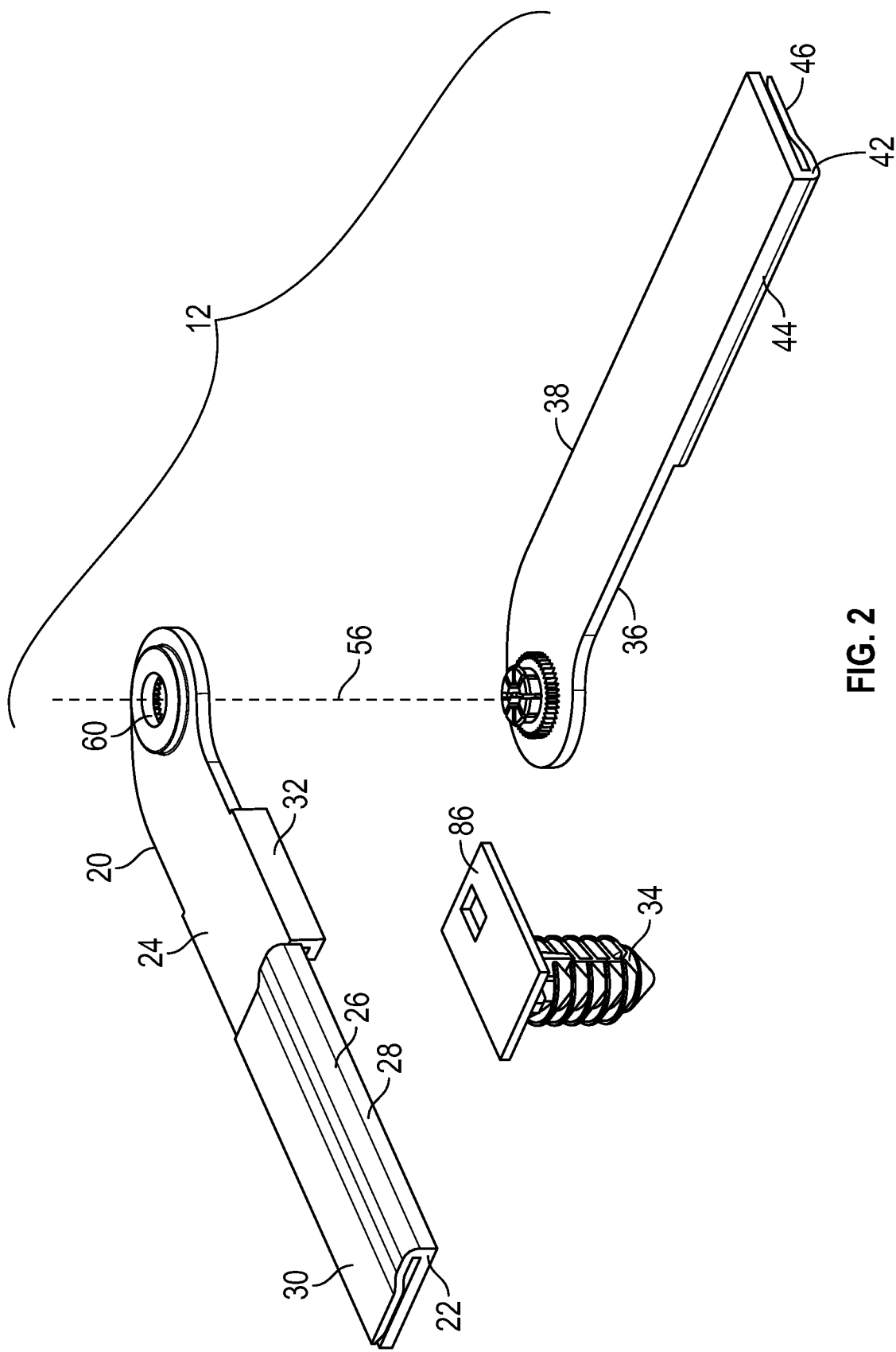
FIG. 2 is an exploded view of the angle clip assembly from FIG. 1.

Referring to FIG. 2, there is illustrated an exploded view of the angle clip assembly 12. The angle clip assembly 12 includes a first guide 20. The illustrated first guide 20 is molded from plastic, but may be made from any desired material using any desired process. The first guide 20 includes a first guide body 22. A first guide surface 24 is defined on one side of the first guide body 22. The illustrated first guide surface 24 is a flat surface, but may have any desired shape. The first guide 20 also includes a first retainer 26 that extends from the first guide body 22. The first retainer 26 includes a first base 28 that is attached to the first guide body 22 and a first clamp 30 that is supported adjacent to a portion of the first guide surface 24. In the illustrated embodiment, the first retainer 26 is molded as part of the first guide body 22, but may be a separate piece if desired. The first retainer 26 is adapted to hold a portion of the cable 14 in a desired position on the first guide surface 24, as shown in FIG. 1.

The first guide 20 includes a clip holder 32 that is located on the first guide body 22 on an opposite side from the first guide surface 24. The clip holder 32 is adapted to retain a clip 34 on the first guide 20 and will be described in detail below.

Figure 8:
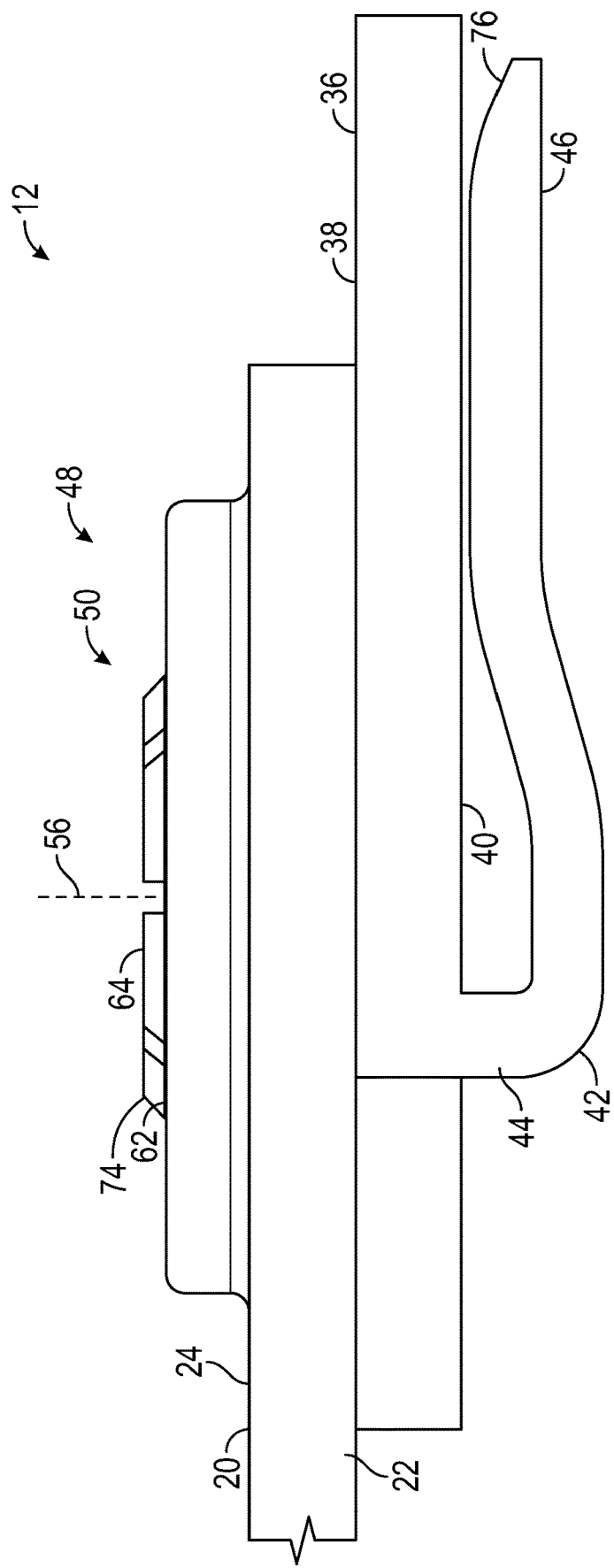
FIG. 8 is a side elevational view of the assembled angle clip assembly.

The angle clip assembly 12 also includes a second guide 36. The illustrated second guide 36 is molded from plastic, but may be made from any desired material using any desired process. The second guide 36 includes a second guide body 38. A second guide surface 40 (best seen in FIG. 8) is defined on one side of the second guide body 38. The illustrated second guide surface 40 is a flat surface, but may have any desired shape. The second guide 36 also includes a second retainer 42 that extends from the second guide body 38. The second retainer 42 includes a second base 44 that is attached to the second guide body 38 and a second clamp 46 that is supported adjacent to a portion of the second guide surface 40. In the illustrated embodiment, the second retainer 42 is molded as part of the second guide body 38, but may be a separate piece if desired. The second retainer 42 is adapted to hold a portion of the cable 14 in a desired position on the second guide surface 40, as shown in FIG. 1.

Figure 3:
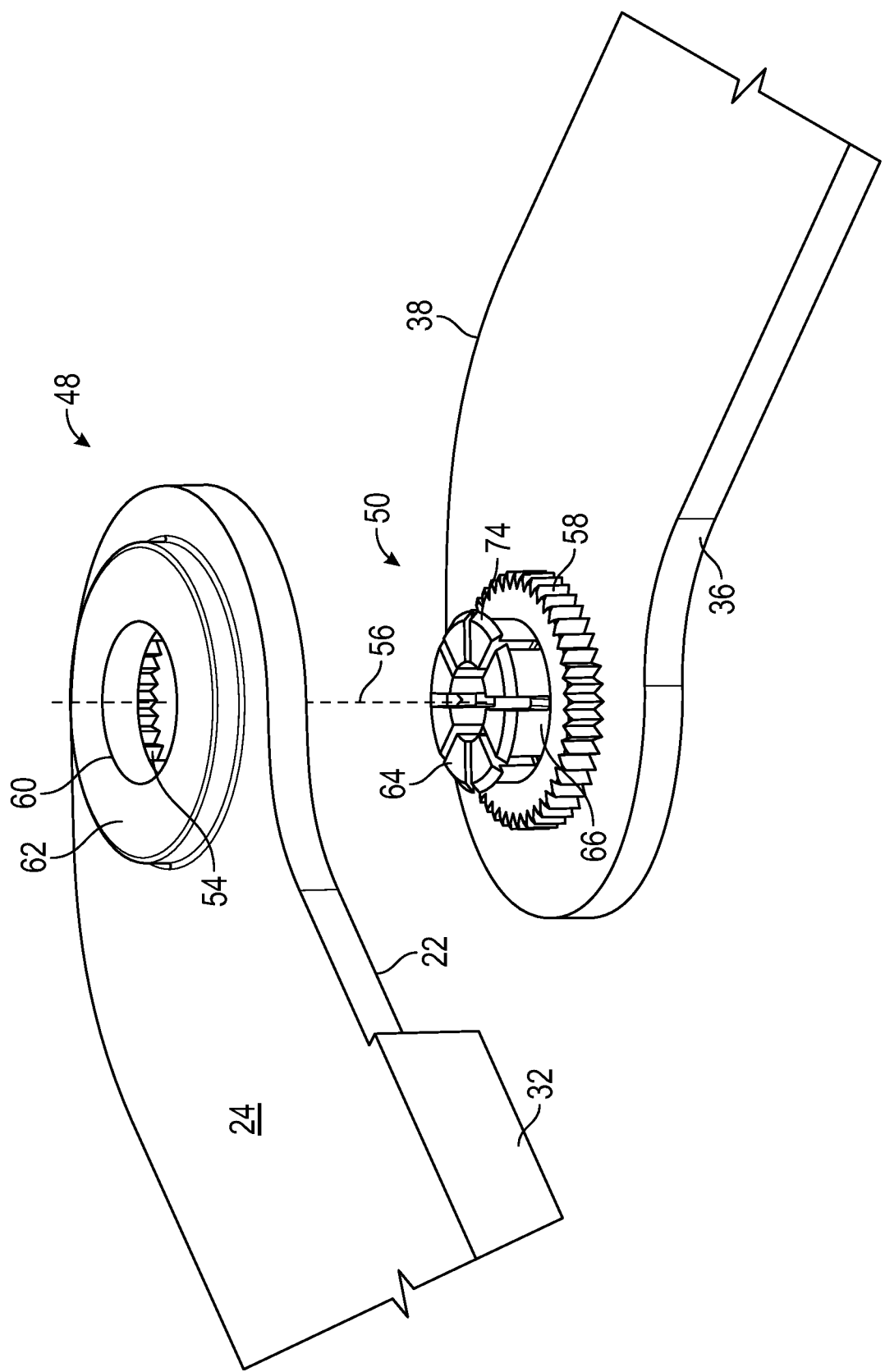
FIG. 3 is an enlarged view of a portion of FIG. 2.
Figure 5:
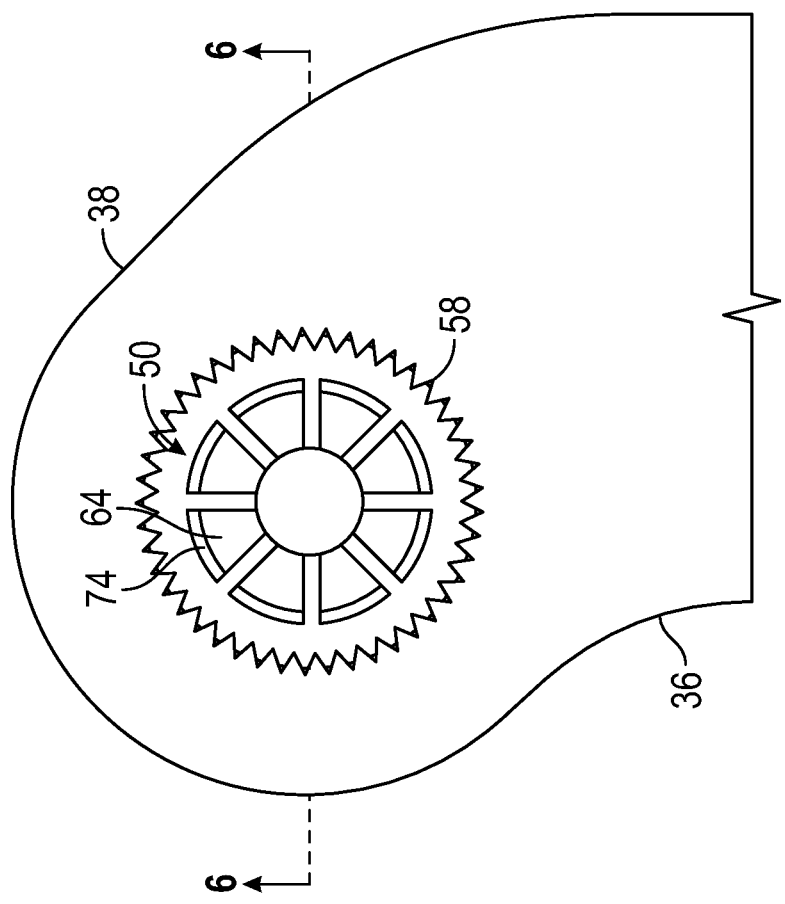
FIG. 5 is a top plan view of a portion of a second guide from FIG. 2.
Figure 4:
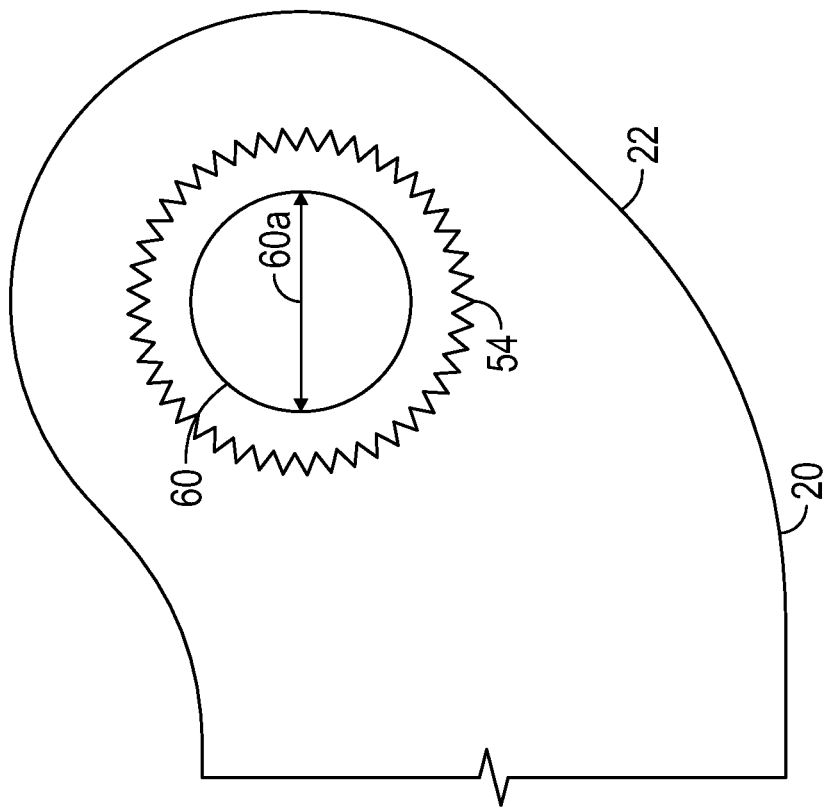
FIG. 4 is a bottom plan view of a portion of a first guide from FIG. 2.

The angle clip assembly 12 includes a lock assembly, indicated generally at 48. FIG. 3 is an enlarged view of part of FIG. 2 showing the lock assembly 48. The lock assembly 48 is adapted to retain the first guide 20 in a desired position relative to the second guide 36, as will be described below. The lock assembly 48 includes an axial lock, indicated generally at 50, and a radial lock, indicated generally at 52. FIGS. 4 and 5 show part of the lock assembly 48. FIG. 4 is a plan view from below of part of the first guide 20, and FIG. 5 is a plan view from above of part of the second guide 36.

The first guide 20 includes a first plurality of teeth 54 that are arranged in a circle around a lock axis 56. The first plurality of teeth 54 face inwardly toward the lock axis 56. The second guide 36 includes a second plurality of teeth 58 that are arranged in a circle around the lock axis 56. The second plurality of teeth 58 face outwardly away from the lock axis 56. The first plurality of teeth 54 and the second plurality of teeth 58 are part of the radial lock 52, and the operation of the radial lock 52 will be described below.

The first guide 20 also includes a hole 60 that passes through the first guide body 22. The hole 60 has a circular cross-sectional shape with an inner diameter 60a. The lock axis 56 passes through the center of the hole 60, perpendicular to the circular cross-section. The first guide 20 includes a catch surface 62 located around the hole 60 on the same side of the first guide body 22 as the first guide surface 24. The second guide 36 includes a plurality of resilient lock arms 64. The lock arms 64 extend from the second guide body 38 on the same side as the second guide surface 40, parallel to the lock axis 56. The lock arms 64 are located around the lock axis 56. Each lock arm 64 has an outer surface 66 with a semi-circular shape. The outer surfaces 66 of all of the lock arms 64 are located in a circle centered on the lock axis 56 that has a diameter smaller than the inner diameter 60a. The illustrated second guide 36 includes eight lock arms 64, but may include any desired number of lock arms 64. The hole 60 and the lock arms 64 are part of the axial lock 50, and the operation of the axial lock 50 will be described below.

Figure 6:
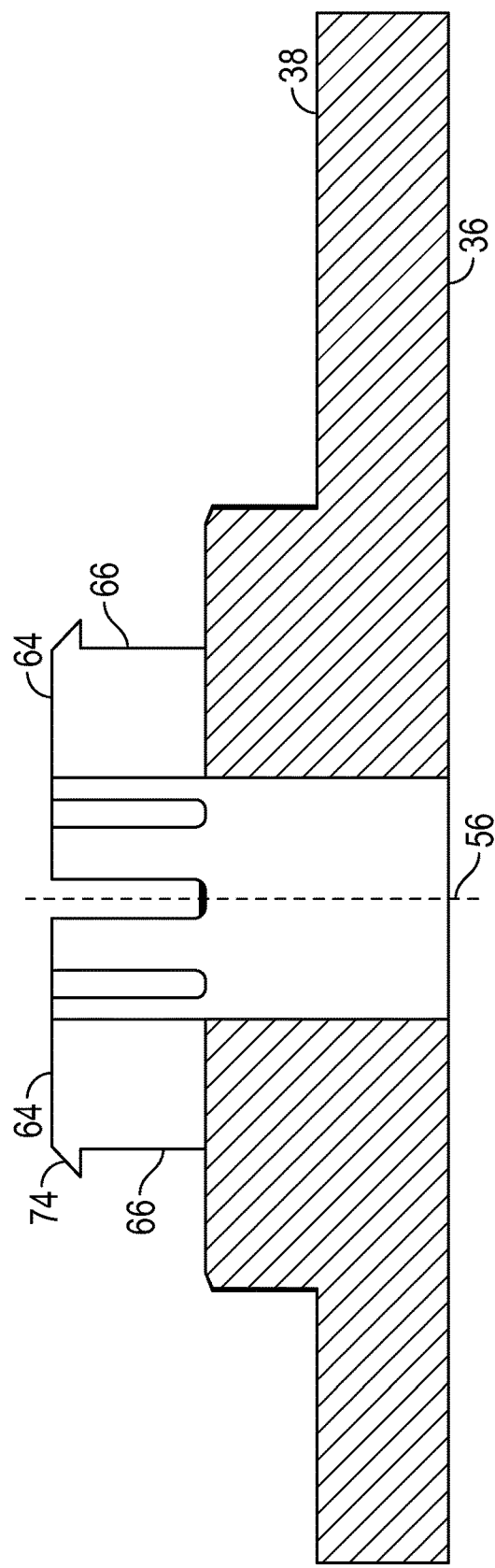
FIG. 6 is a cross-sectional view taken along the line 6-6 of FIG. 5.
Figure 7:
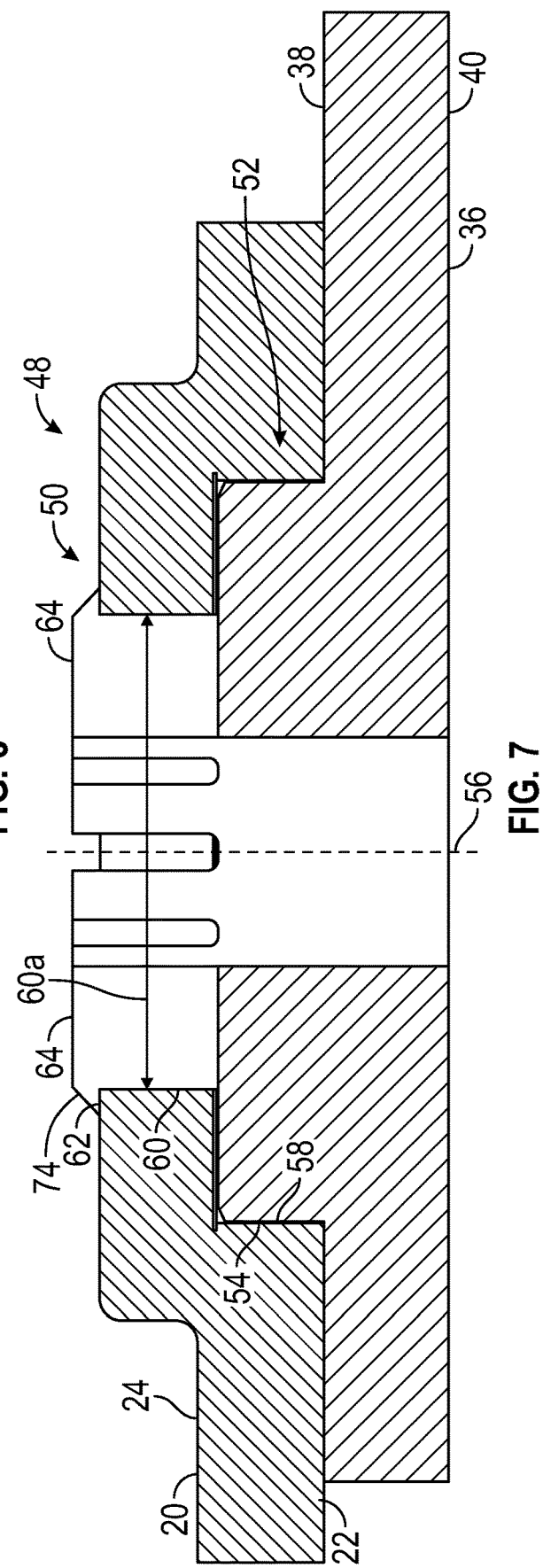
FIG. 7 is a cross-sectional view similar to FIG. 6, with the first guide shown engaged with the first guide.

Referring to FIG. 6, there is illustrated a cross-sectional view taken along the line 6-6 of FIG. 5, through the part of lock assembly 48 on the second guide 36. FIG. 7 is a cross-sectional view similar to FIG. 6, showing the first guide 20 attached to the second guide 36.

In order to attach the first guide 20 to the second guide 36, the first guide 20 and the second guide 36 are initially positioned as shown in FIG. 3, with the lock arms 64 extending toward the first guide 20. Referring back to FIG. 1, the first guide 20 and the second guide 36 are shown at an assembly angle 68 of approximately ninety degrees. The assembly angle 68 is measured between a first guide surface axis 70 and a second guide surface axis 72. Referring back to FIG. 3, the assembly angle 68 may be selected before the first guide 20 is mated with the second guide 36 by rotating the first guide 20 about the lock axis 56 relative to the second guide 36. Thus, the position of the first guide 20 is adjustable relative to the second guide 36 and the assembly angle 68 of the angle clip assembly 12 is adjustable to a desired value.

The first guide 20 is then moved parallel to the lock axis 56 to engage the second guide 36 and the first plurality of teeth 54 mesh with the second plurality of teeth 58. When the first plurality of teeth 54 mesh with the second plurality of teeth 58, the first guide 20 is prevented from rotating about the lock axis 56 relative to the second guide 36. Thus, the angle clip assembly 12 is adjustable to the desired assembly angle 68 prior to assembly and the radial lock 52 retains the assembled angle clip assembly 12 at the desired assembly angle 68.

Additionally, when the first guide 20 is moved parallel to the lock axis 56 to engage the second guide 36 the lock arms 64 will engage the first guide body 22. Each lock arm 64 includes a latch 74 on an outer end thereof. When the first guide 20 is moved parallel to the lock axis 56 to engage the second guide 36, the latches 74 are pushed toward the lock axis 56 and the respective lock arms 64 are bent to allow the lock arms 64 and latches 74 to fit through the hole 60 in the first guide body 22. Once the latches 74 have passed through the first guide body 22, the lock arms 64 rebound away from the lock axis 56 and the latches 74 engage the catch surface 62 to prevent the first guide 20 from being moved away from the second guide 36. Thus, the axial lock 50 prevents the first guide 20 from moving parallel to the lock axis 56 relative to the second guide 36.

Referring now to FIG. 7, there is illustrated a side elevational view of the angle clip assembly 12 taken along the second guide surface axis 72. As previously described, the second retainer 42 extends from the second guide body 38 and includes the second clamp 46 that is supported adjacent to a portion of the second guide surface 40. The second retainer 42 includes a beveled edge 76 on the outer end to make it easier to insert part of the cable 14 between the second guide surface 40 and the second clamp 46. When part of the cable 14 is so inserted, it is pressed between the second guide surface 40 and the second clamp 46 and is retained in place on the second guide surface 40, as shown in FIG. 1. The cable 14 includes a first cable side 78 that faces the second guide surface 40, and an opposite second cable side 80. The cable 14 is then twisted to make part of the first cable side 78 engage the first guide surface 24 and part of the cable 14 is held in place by the first retainer 26 on the first guide surface 24.

The part of the cable 14 retained on the first guide surface 24 extends from the first cable run 16 and extends parallel to the first guide surface axis 70 while the part of the cable 14 retained on the second guide surface 40 extends from the second cable run 18 and extends parallel to the second guide surface axis 72. The cable 14 includes a twist 82 between the first cable run 16 and the second cable run 18. The twist 82 is provided to change the direction of the cable 14 from parallel to the first guide surface axis 70 to parallel to the second guide surface axis 72 and to flip the cable 14 (vertically, as shown in FIG. 1) so that the first cable side 78 engages both the first guide surface 24 and the second guide surface 40, which are located on opposite sides of the angle clip assembly 12. The twist 82 prevents a sharp or sudden bend in the cable 14, which could damage the cable 14.

As shown in FIG. 1, the lock assembly 48 is offset to one side of angle clip assembly 12 and the lock axis 56 does not pass through either the first guide surface axis 70 or the second guide surface axis 72. However, the lock assembly 48 may be in any desired position on the angle clip assembly 12. As viewed in FIG. 1, from the first cable run 16 the lock assembly 48 is offset to the right and the illustrated angle clip assembly 12 is adapted for right-hand turns of the cable 14.

Figure 9:
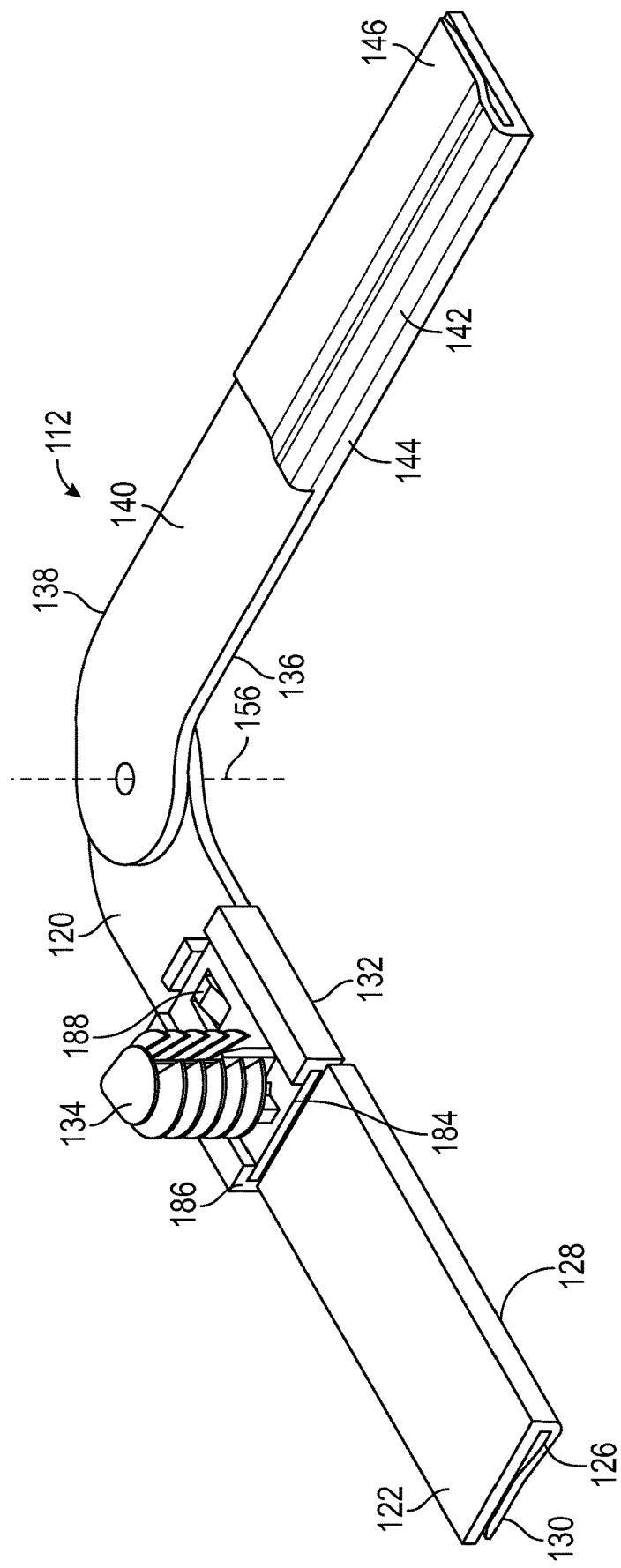
FIG. 9 is a perspective view from below of a second embodiment of an angle clip assembly.

Referring to FIG. 9, there is illustrated a perspective view from below of a second embodiment of an angle clip assembly, indicated generally at 112. The second angle clip assembly 112 is substantially the same as the angle clip assembly 12, and similar components are identified by the same number increased by 100. The second angle clip assembly 112 includes a lock assembly (not visible) that is offset to the left and the illustrated second angle clip assembly 112 is adapted for left-hand turns of the cable 14.

A clip holder 132 is visible in FIG. 9. The clip holder 132 is substantially the same as the clip holder 32, and is adapted to retain a clip 134 on the first guide 120. The clip 134 is attached to a clip plate 184. The clip plate 184 is slid into a clip channel 186 defined in the clip holder 134 and a latch 188 engages the clip plate 184 to hold the clip 134 in place. The illustrated clip 134 is a fir tree clip, and is adapted to engage a structure (not shown) to hold the second angle clip assembly 112 in place relative to the structure. However, the clip 134 may be any desired type of clip or retainer.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A supported cable assembly comprising:
   a first guide including a first guide surface and a first retainer that retains a first part of a flat flexible cable;
   a second guide including a second guide surface and a second retainer that retains a second part of the flat flexible cable, the second guide being rotatable relative to the first guide about a lock axis to one of a plurality of assembly angles; and
   a radial lock including teeth on the first and second guides that mesh with each other to prevent rotation of the first guide relative to the second guide.

2. The supported cable assembly of claim 1, further comprising an axial lock that prevents movement of the first guide relative to the second guide in a direction parallel to the lock axis.

3. The supported cable assembly of claim 2, wherein the axial lock comprises a plurality of lock arms that extend from the second guide parallel to the lock axis, and wherein the lock arms engage the first guide to prevent movement of the first guide relative to the second guide in a direction parallel to the lock axis.

4. The supported cable assembly of claim 1, wherein the radial lock includes a first plurality of teeth on the first guide and a second plurality of teeth on the second guide, and the first plurality of teeth mesh with the second plurality of teeth to prevent rotation of the first guide relative to the second guide.

5. The supported cable assembly of claim 4, further comprising an axial lock that prevents movement of the first guide relative to the second guide in a direction parallel to the lock axis.

6. The supported cable of claim 5, wherein the axial lock comprises a plurality of lock arms that extend from the second guide parallel to the lock axis, and wherein the lock arms engage the first guide to prevent movement of the first guide relative to the second guide in a direction parallel to the lock axis.

7. The supported cable assembly of claim 1, wherein the first guide surface and the second guide surface are located on opposite sides of the supported cable assembly.

8. The supported cable assembly of claim 7, further comprising an axial lock that prevents movement of the first guide relative to the second guide in a direction parallel to the lock axis.

9. The supported cable assembly of claim 8, wherein the axial lock comprises a plurality of lock arms that extend from the second guide parallel to the lock axis, and wherein the lock arms engage the first guide to prevent movement of the first guide relative to the second guide in a direction parallel to the lock axis.

10. The supported cable assembly of claim 7, wherein the radial lock includes a first plurality of teeth on the first guide and a second plurality of teeth on the second guide, and the first plurality of teeth mesh with the second plurality of teeth to prevent rotation of the first guide relative to the second guide.

11. An angle clip assembly comprising:
    a first guide including a first guide surface and a first retainer adapted to retain a first part of a flat flexible cable on the first guide surface;
    a second guide including a second guide surface and a second retainer adapted to retain a second part of the flat flexible cable on the second guide surface that is on the opposite side of the angle clip assembly from the first guide surface, the second guide rotatable relative to the first guide about a lock axis to one of a plurality of assembly angles;
    a radial lock including a first plurality of teeth on the first guide and a second plurality of teeth on the second guide, wherein the first plurality of teeth mesh with the second plurality of teeth to prevent rotation of the first guide relative to the second guide; and
    an axial lock including a plurality of lock arms that extend from the second guide parallel to the lock axis, wherein the lock arms engage the first guide to prevent movement of the first guide relative to the second guide in a direction parallel to the lock axis.

12. The angle clip assembly of claim 11 further comprising a flat flexible cable with a first side and a second side; wherein:
    a first guide retains the first part of first side of the flat flexible cable on the first guide surface; and
    a second guide retains the second part of the first side of the flat flexible cable on the second guide surface, wherein the second guide surface is on the opposite side of the angle clip assembly from the first guide surface.

13. An angle clip assembly comprising:
    a first guide including a first guide surface and a first retainer adapted to retain a first part of a flat flexible cable on the first guide surface;
    a second guide including a second guide surface and a second retainer adapted to retain a second part of the flat flexible cable on the second surface, the first guide in the second guide being rotatable relative to one another about a lock axis to one of the plurality of assembly angles;
    a radial lock including teeth on the first and second guides that mesh with each other to prevent rotation of the first guide relative to the second guide; and
    an axial lock that prevents movement of the first guide relative to the second guide in a direction parallel to the lock axis, wherein the axial lock includes a plurality of lock arms that extend from the second guide parallel to the lock axis, and the lock arms engage the first guide to prevent movement of the first guide relative to the second guide in a direction parallel to the lock axis.

* * * * *